(12) United States Patent
Desplechain

(10) Patent No.: US 11,709,984 B2
(45) Date of Patent: Jul. 25, 2023

(54) AUTOMATIC SEQUENTIAL RETRY ON COMPILATION FAILURE

(71) Applicant: Synopsys, Inc., Mountain View, CA (US)

(72) Inventor: Guillaume Jean Baptiste Desplechain, Massy (FR)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/541,886

(22) Filed: Dec. 3, 2021

(65) Prior Publication Data
US 2022/0180035 A1    Jun. 9, 2022

Related U.S. Application Data

(60) Provisional application No. 63/120,910, filed on Dec. 3, 2020.

(51) Int. Cl.
*G06F 30/3323* (2020.01)
*G06F 30/327* (2020.01)
*G06F 30/323* (2020.01)
G06F 119/02 (2020.01)

(52) U.S. Cl.
CPC ........ *G06F 30/3323* (2020.01); *G06F 30/323* (2020.01); *G06F 30/327* (2020.01); *G06F 2119/02* (2020.01)

(58) Field of Classification Search
CPC .. G06F 30/3323; G06F 30/327; G06F 30/323; G06F 2119/02
USPC .................................... 716/103, 104; 703/14
See application file for complete search history.

(56) References Cited

U.S. PATENT DOCUMENTS

| 5,375,239 | A | * | 12/1994 | Mortson | G06F 8/41 |
| | | | | | 717/140 |
| 11,023,635 | B1 | * | 6/2021 | Coudert | G06F 30/331 |
| 2013/0167123 | A1 | * | 6/2013 | Dura | G06F 11/3624 |
| | | | | | 717/127 |
| 2021/0117601 | A1 | * | 4/2021 | Srinivasan | G06F 30/331 |
| 2021/0216404 | A1 | * | 7/2021 | Buller | G06F 11/0772 |

(Continued)

OTHER PUBLICATIONS

Fan et al., Chinese Patent Document No. CN-110569792-A, Published Dec. 13, 2019, English abstract. (Year: 2019).*

(Continued)

*Primary Examiner* — Phallaka Kik
(74) *Attorney, Agent, or Firm* — Fenwick & West LLP

(57) ABSTRACT

A compilation system accesses a compilation operations that can be used by a compiler to compile a design under test (DUT). The compilation system can determine a sequence of the compilation operations for the compiler to perform the compilation. The compilation system can detect a failure at a first compilation operation of the sequence of operations during the compilation of the DUT, and the compilation of the DUT can be paused after the failure is detected. The compilation system can determine a second compilation operation of the accessed compilation operations based on one or more netlist parameters of the DUT's netlist. The compilation system then modifies the sequence of compilation operations based on the second compilation operation and resumes the compilation of the DUT at the second compilation operation using the modified sequence of compilation operations.

20 Claims, 10 Drawing Sheets

(56) References Cited

U.S. PATENT DOCUMENTS

2021/0256186 A1* 8/2021 Lee .................. G06F 30/3312
2022/0318468 A1* 10/2022 Srinivasan ............ G06F 30/392

OTHER PUBLICATIONS

Agnesina, A. et al. "Reducing Compilation Effort in Commercial FPGA Emulation Systems Using Machine Learning." 2019 IEEE/ACM International Conference on Computer-Aided Design (ICCAD), Nov. 4-7, 2019, pp. 1-8.
Agnesina, A. et al. "Improving FPGA-Based Logic Emulation Systems through Machine Learning." ACM Transactions on Design Automation of Electronic Systems, vol. 25, No. 5, Sep. 2020, pp. 1-20.
Lahti, G. D. et al. "Tcl: The Good, The Bad, and The Ugly." SNUG Boston, Jan. 1, 2000, pp. 1-25.
PCT International Search Report and Written Opinion, PCT Application No. PCT/US2021/061790, dated Mar. 4, 2022, 16 pages.

* cited by examiner

AUTOMATIC SEQUENTIAL RETRY ON COMPILATION FAILURE

RELATED APPLICATION

This application claims priority under 35 U.S.C. § 119(e) to U.S. Provisional Patent Application Ser. No. 63/120,910, "Automatic Sequential Retry on Compilation Failure," filed Dec. 3, 2020. The subject matter of the foregoing is incorporated herein by reference in their entirety.

TECHNICAL FIELD

The present disclosure generally relates to an emulation system for verifying circuit design. In particular, the present disclosure relates to a system and method for providing automatic sequential retry on a compilation failure.

BACKGROUND

A hardware emulators may include multiple (e.g., hundreds of) field-programmable gate arrays (FPGAs) to emulate hardware designs of large circuits or systems made of multiple integrated circuits (ICs) such as central processing units (CPUs), graphics processing units (GPUs), and systems on a chip (SoCs). Any such hardware design or description thereof, within a given scope for testing, may be referred to as a design under test (DUT).

The DUT may be mapped onto FPGAs by an automatic partitioning process. However, a critical problem is that one single compilation failure may render the entire DUT unworkable on an emulator, and may force the compilation to restart from the beginning. FPGA compilation tools may provide some strategies designed to achieve specific design objectives. Throughout emulation or prototyping using an automatic partitioning process, FPGA compilation may be unpredictable, and this prevents guaranteed success of pre-defined place-and-route (P&R) strategies of FPGA design system. After an FPGA compilation failure, FPGA compilation tools may not deliver a usable checkpoint or a bitstream for a given application, thus rendering a DUT non-workable.

FPGA devices are becoming larger and larger and may include millions of logic cells. Consequently, netlists corresponding to the logic cells within the FPGA devices also grow larger, and FPGA P&R tends to require more CPU, power, and memory resources. A compilation failure may strain those resources, and costs of such failures increase with new FPGA generations. In the emulation domain, as similar to the prototyping domain, the cost of a failure is higher with each FPGA failure. This can be problematic even if dozens of other FPGAs are successfully compiled. The probability of failure increases with the number of FPGAs.

SUMMARY

A compilation system accesses a compilation operations that can be used by a compiler to compile a design under test (DUT). The compilation system can determine a sequence of the compilation operations for the compiler to perform the compilation. The compilation system can detect a failure at a first compilation operation of the sequence of operations during the compilation of the DUT, and the compilation of the DUT can be paused after the failure is detected. The compilation system can determine a second compilation operation of the accessed compilation operations based on one or more netlist parameters of the DUT's netlist. The compilation system then modifies the sequence of compilation operations based on the second compilation operation and resumes the compilation of the DUT at the second compilation operation using the modified sequence of compilation operations.

In one embodiment, the first compilation operation can include a design placement in the sequence of compilation operations. In this embodiment, the compilation failure can include determining that a number of cells of the DUT exceeds an available number of cells for allocation by an emulation system coupled to the compiler. In another embodiment, the first compilation operation includes a design routing in the sequence of compilation operations. In this embodiment, the compilation failure can include determining that the design routing fails to comply with timing constraints.

In some embodiments, the compilation system determines the second compilation operation by applying a machine learning model to the netlist parameters. The machine learning model can be configured to determine the second compilation operation based on historical netlist parameters and historical sequences of compilation operations. In some embodiments, the compilation system determines the second compilation operation by determining that the second compilation operation is mapped to historical netlist parameter values that are within a threshold range of a value of the netlist parameters of the DUT.

The compilation system can receive a command language script including instructions for modifying the compilation flow based on detected failures in the sequence of compilation operations and the netlist parameters. The compilation system can then initiate the sequence of compilation operations at the compiler using the command language script.

The sequence of compilation operations can be executed by the compiler using a finite state machine including various states corresponding to the sequence of compilation operations. In some embodiments, the compilation system detects that the compilation of the DUT using the second compilation operation is successful, generates a record mapping the second compilation operation and the netlist parameters of the DUT, and annotates the record as successfully compiling the DUT. The record can be queried for a subsequent compiling of another DUT using a netlist parameter of the other DUT.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
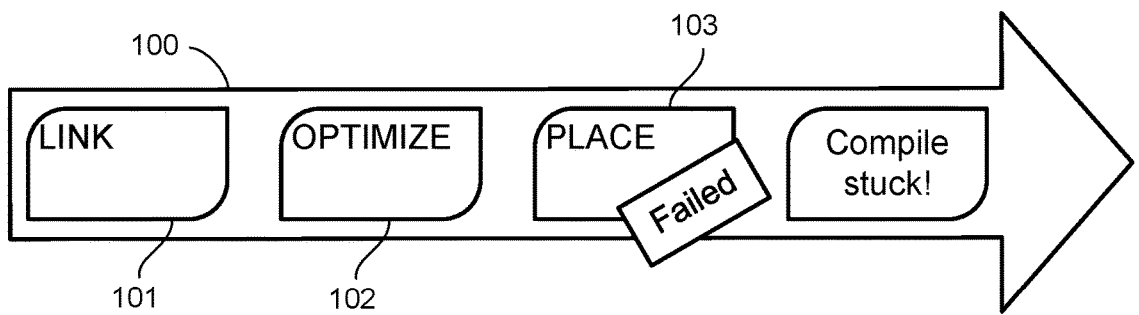
FIG. 1 illustrates a failed compilation, according to one embodiment.

Because compilation failures can demand many processing, power, and memory resources, users demand more reliable FPGA compilation. Aspects of the present disclosure relate to compiling a logical representation of a design under test (DUT) and more specifically, to resuming compilation of the logical representation on a field-programmable gate array (FPGA) upon detecting a compilation failure. By automatically and sequentially providing several compilation strategies, FPGA failures and any duplicative work that may result therefrom may be avoided or otherwise mitigated.

The automatic sequential retry on failure FPGA compiler may modify and resume compilation of a DUT until compilation is successful. For example, the compilation system may determine compilation operations for retrying compilation upon compiler failure. Operations may include commands or settings for FPGA design systems, automation scripts, or other choices that can be made during a compilation workflow that may change the outcome of a given compilation attempt. A compilation workflow is an arrangement of compilation operations (e.g., sequential and/or parallel steps) performed by a compiler to compile a DUT. Using the compilation systems and methods described herein, logical representations of a DUT may be compiled in a compilation workflow without requiring a user to stop and relaunch FPGA design system from scratch. Compared to using only an FPGA design system alone, adding the present techniques disclosed herein may improve reliability, speed, and efficiency of the compilation process. Compared to a typical compilation technique of executing various compilation workflows in parallel to increase the likelihood of executing a successful compilation, the enhanced techniques disclosed herein consume less processing, power, and memory resources. Further benefits may be derived from applying machine learning (ML) processes in the present techniques disclosed herein. By using machine learning, or any other suitable modeling technique for determining a compilation operation that has a high likelihood of resulting in a successful compilation, the compilation system described herein further reduces consumption of computing resources that would otherwise be spent iterating through less successful compilation operations.

A compilation workflow may be divided into one or more compilation operations, which may also be referred to herein as "steps." A compilation operation may be characterized by a type of operation (e.g., "link," "optimize," "place," and "route") and one or more functions performed when the operation is executed by the compiler. Table 1 below describes compilation operations and corresponding functions performed by a compiler.

TABLE 1

| FPGA Compilation Operations and Function(s) | |
|---|---|
| Compilation Operation | Function(s) Performed During Operation |
| Link | Load sources and link design hierarchy to the target FPGA |
| Optimize | Optimize netlist and remap optimized netlist to facilitate netlist placing |
| Place | Places ports and cells onto device resources of the target FPGA |
| Route | Route nets between instantiated resources |

FIG. 1 illustrates a failed compilation, according to one embodiment. A compilation workflow 100 may be executed by an FPGA compiler. As described in Table 1, the compilation workflow 100 is divided into operations include a link operation 101, an optimize operation 102, and a placement operation 103. The compilation workflow 100 may progress sequentially from the link operation 101 to the placement operation 103. Upon executing the placement operation 103, the compilation workflow 100 fails due to an unsuccessful execution of the placement operation 103. In one example of a compilation failure at the placement operation 103, an automated P&R of an FPGA design system may have too many cells to allocate than available in the FPGA. One example solution, as discussed with reference to FIG. 2, may include remapping these cells onto other cells with compatible functionality. For example, multiple look-up table random access memories (LUTRAMs) may be combined into one or more block random access memories (RAMs). The compilation workflow 100 may include additional operations before or after the operations 101-103 depicted. For example, due to the failure at the placement operation 103, the compiler is unable to continue executing the compilation workflow 100 to a route operation following the placement operation 103.

Figure 2:
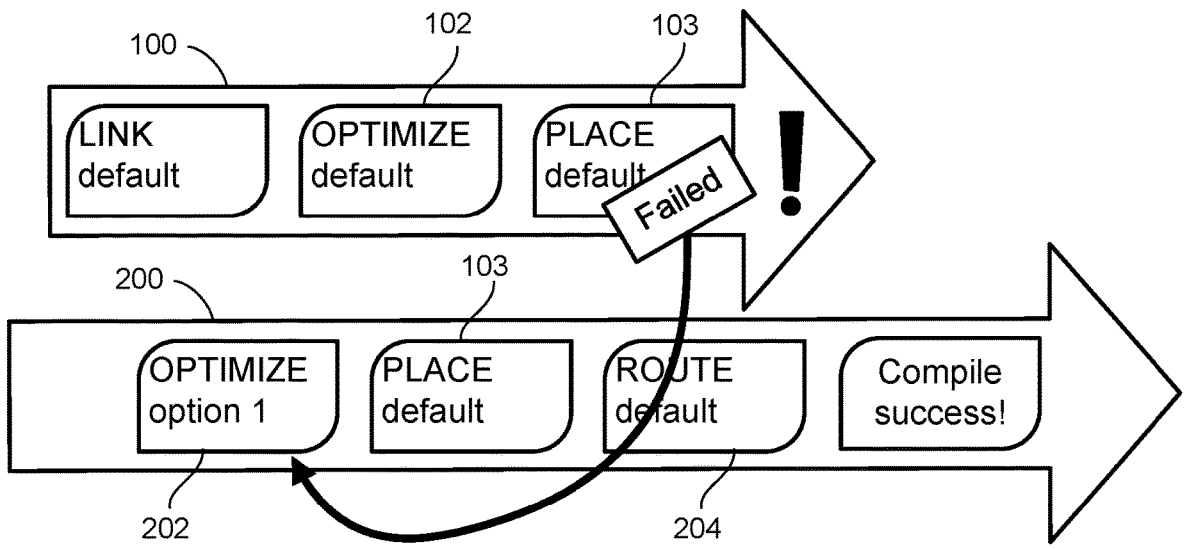
FIG. 2 illustrates a successful compilation that has been retried upon a failure, according to one embodiment.

FIG. 2 illustrates a successful compilation that has been retried upon a failure, according to one embodiment. The compilation system described herein may retry compilation of the DUT by using a compilation workflow 200 rather than the failed compilation workflow 100 of FIG. 1. In particular, the compilation system may detect that the compilation workflow 100 has failed and determine to execute the compilation workflow 200 instead. In some embodiments, the compilation system provides a copy of the netlist of the DUT to the compiler for compilation. The netlist is a logical representation of the DUT, characterizing at least a portion of the DUT. Additionally, the compilation system may specify one or more compilation workflow(s) to the compiler to execute (e.g., the compilation workflow 100), initiating the compilation of the DUT using a compilation workflow.

The compilation system may receive a notification of the compilation failure from the compiler, including the operation 103 at which the compilation failed. After receiving the notification, the compilation system may pause the compilation of the DUT. That is, the compilation system may pause compilation to determine an intermediary step in the compilation workflow (e.g., an operation after the link operation 101 at the start of the compilation workflow) from which to resume compilation after failure rather than restarting compilation from the beginning of a compilation workflow (e.g., at the link operation 101). In some embodiments, the compilation system determines to resume compilation at the beginning of a compilation workflow after a failure, and the compilation system may still pause compilation to make this determination.

During the paused compilation, the compilation system may determine a different compilation operation with which to retry compiling the DUT. The compilation system may receive or have access to various compilation operations before starting compilation. In some embodiments, the compilation system may receive a default set of compilation operations (e.g., specified within an EDA system). For example, as shown in FIG. 2, the compilation operations of the compilation workflow 100 are default compilation operations, which may be default operations provided by an EDA system. Default operations may be different from the compilation operations with which compilation is determined to be resumed upon a compiler failure. For example, the default optimize operation 102 may be different from an optimize option operation 202. Additionally or alternatively, the compilation system may receive a set of user-specified compilation operations. For example, a user may provide the user-specified operations through a host system that is communicatively coupled to the compilation system at a remote server.

A compilation operation provided for retrying compilation may be referred to herein as an compilation option or option. In one example of compilation options, a first compilation option has a type of "place" and is a mapping of logic cells of a netlist to physical cells in one or more FPGAs, a second compilation option has a type of "place" and is a different mapping of the logic cells of the netlist to the physical cells, and a third compilation option has a type of "route" and is a routing of timing paths through a number of cells. In this example, the first and second compilation options can be referred to as place options or place option operations. Similarly, the third compilation option can be referred to as a route option or route option operation. In this example, the mapping and routing in the options are different from the mapping and routing in a default operation. If the default operations cause compilation errors, the compilation system can pause and retry compilation with a different mapping or routing in one of the options. Similarly, if a compilation option causes a compilation error, the compilation system can pause and retry compilation with a different compilation option, which may be of a different type or the same type. The compilation system may determine, using the netlist of the DUT, which of the compilation options with which to resume compilation. The determination of a compilation option is further described in the descriptions of FIGS. 3-5.

A grouping of one or more options may be referred to herein as a compilation strategy. A compilation strategy may be a combination of one compilation option from one or more types of operations. In one example of a compilation strategy, the compilation strategy is one place option specifying a mapping of logic cells of a netlist to physical cells in one or more FPGAs. In a second example of a compilation strategy, the compilation strategy is a combination of a place option specifying a mapping of logic cells and a route option specifying a routing of timing paths through the logic cells, where the route option can be executed following the place option rather than executing a route operation not specified in the strategy (e.g., a default route operation). Compilation strategies and the determination of which compilation strategy to use by the compilation system are described further in the descriptions of FIGS. 7-9 and in Tables 2 and 3.

A compilation option may correspond to a particular compilation failure or failed compilation workflow operation. For example, an option may be an optimize operation that may be executed after a failed optimize operation or a failed place operation, where the optimize option may have a set of parameters (e.g., a physical synthesis for registers including register duplication instead of register retiming) and the failed optimize operation may have a different set of parameters (e.g., a physical synthesis for registers including register retiming instead of register duplication). In this example, the option may not necessarily be executed after a failed link operation, as the optimize operation in the compilation workflow may require a successfully executed link step. In a compilation workflow characterized by a particular sequence of operation types, the operation type of the option can identify where in the compilation workflow at which compilation is resumed. For example, as shown in FIG. 2, the optimize option operation 202 is a first option for an optimize type operation that precedes a place type operation in the sequence of operation types as shown in the compilation workflow 100.

The compilation system can modify operations based on the determined option. For example, the compilation system modifies the compilation workflow 100 based on the optimize option operation 202. The modified operations form the compilation workflow 200, which includes the optimize option operation 202, the placement operation 103, and a route operation 204. The compilation system can instruct a compiler to resume compilation using the modified sequence of operations, where the compilation is resumed at the determined option. For example, the compilation can resume the compilation of the DUT at the optimize option operation 202 using the compilation workflow 200. The determined option with which to resume compilation may be referred to herein as a go-back, resume, or rollback operation. The compilation system may instruct the compiler to load and execute the compilation workflow 200 that begins at the go-back option. Thus, the compilation system avoids restarting compilation from the beginning of the original sequence of operations (e.g., at a link operation). The compilation system may continue to determine options if the compilation system detects subsequent failures. Otherwise, the compiler successfully compiles the DUT and may notify the compilation system of the successful compilation.

Figure 3:
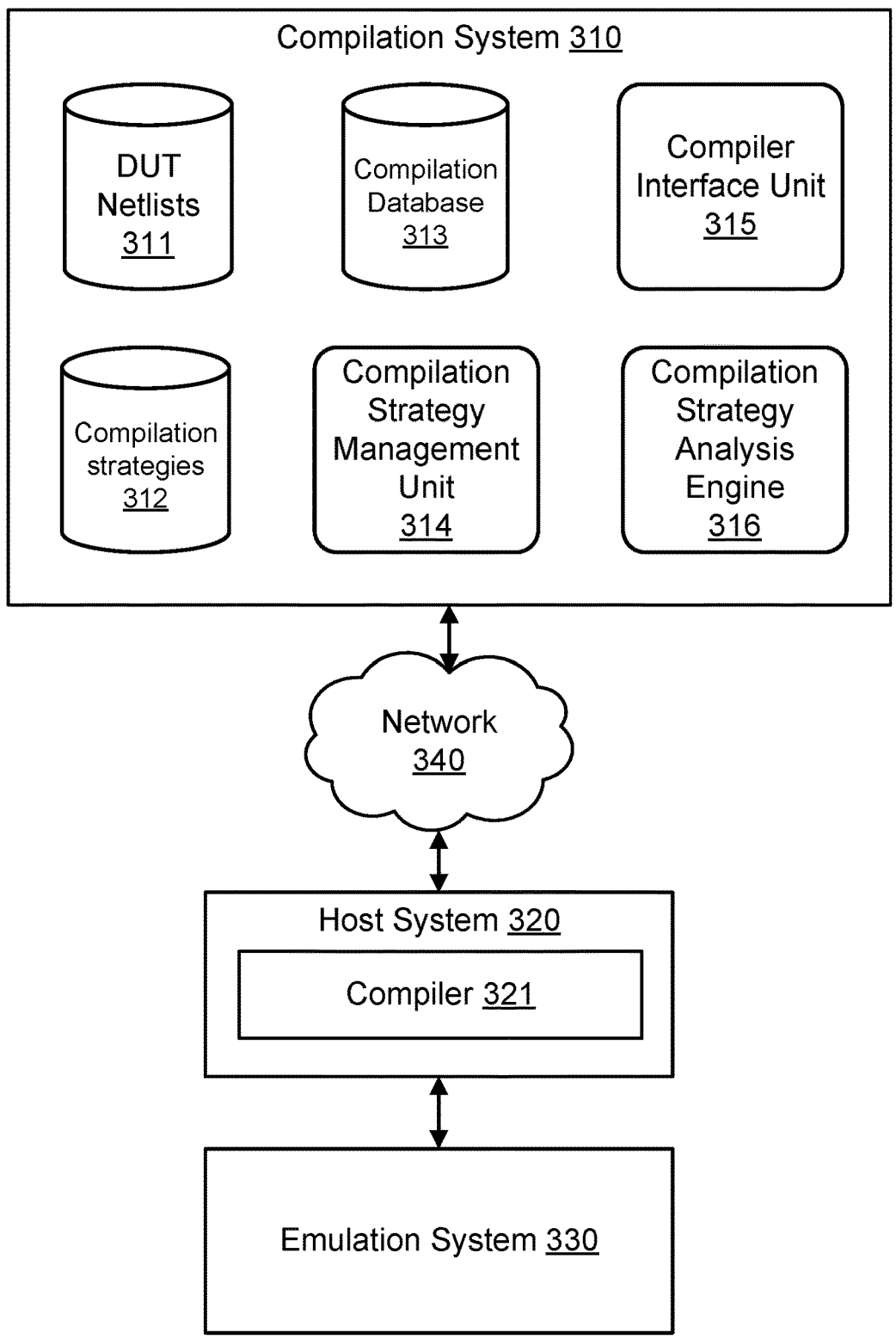
FIG. 3 shows a block diagram of a compilation system, according to one embodiment.
Figure 11:
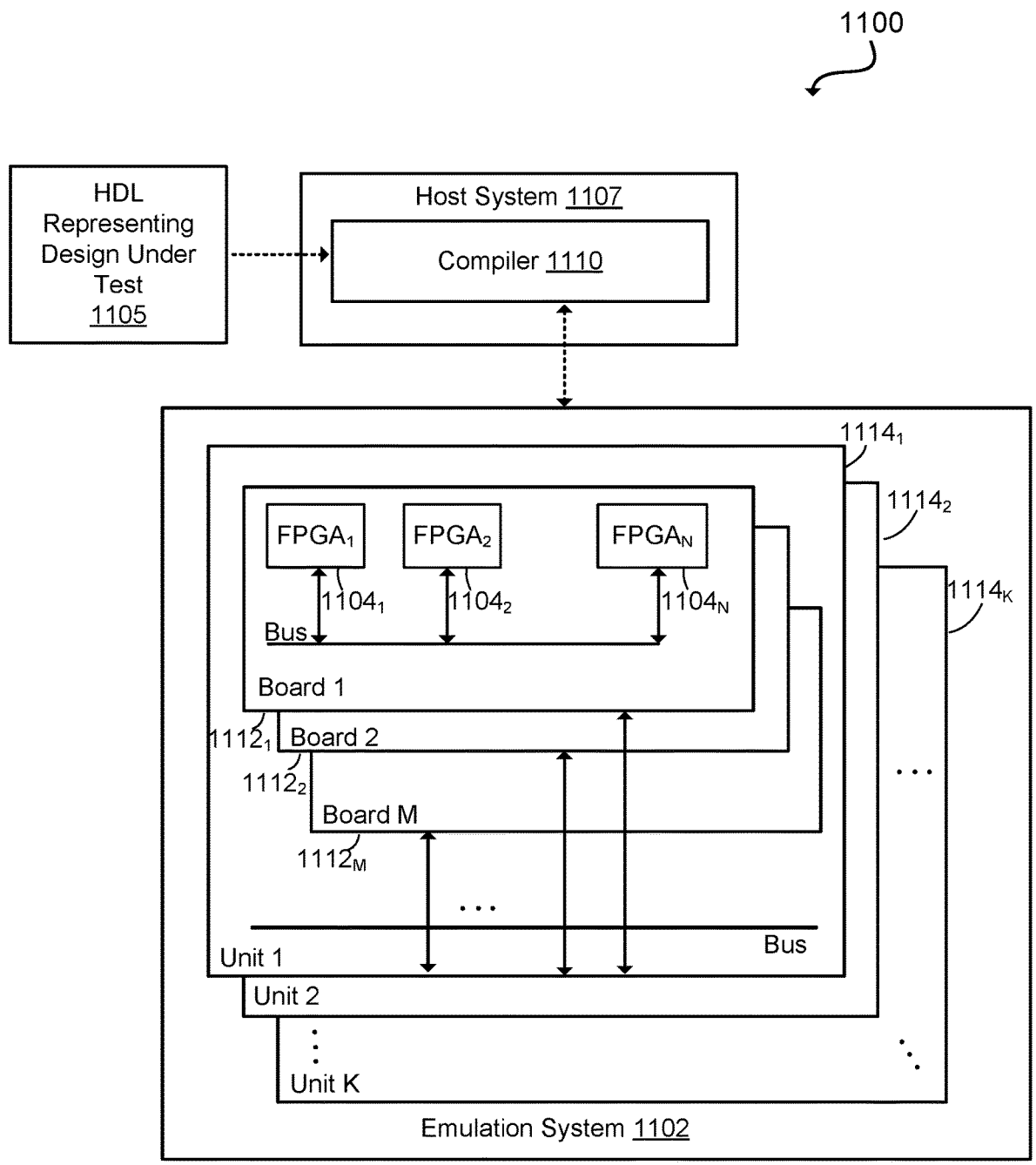
FIG. 11 depicts a diagram of an example emulation system in accordance with some embodiments of the present disclosure.

FIG. 3 shows a block diagram of a compilation system, according to one embodiment. A network environment 300 includes a compilation system 310, a host system 320, an emulation system 330, and a network 340. In some embodiments, the compilation system 310 may include a processor communicatively coupled to the compiler 321 of the host system 320, where the processor executes specific instructions for performing the compilation retry functionality described herein. For example, the compilation system 310 may be a remote server having one or more processors that are communicatively coupled (e.g., via the network 340) to the compiler 321, where the one or more processors execute instructions stored in memory (e.g., memory of the remote server) to perform various processes for retrying compilation described in this disclosure. The host system 320 may be further communicatively coupled to the emulation system 330 that includes one or more FPGAs as shown in FIG. 11.

Figure 12:
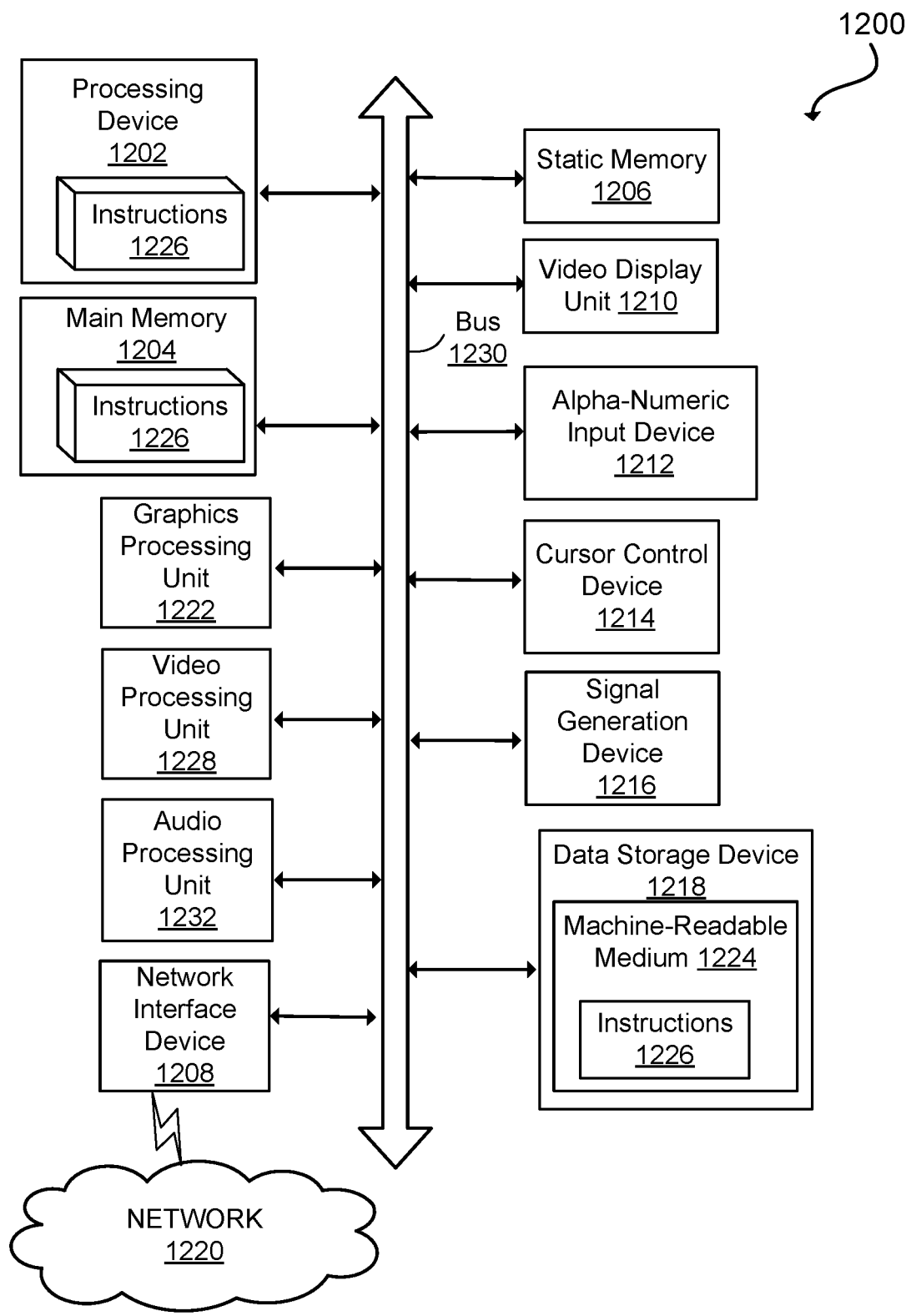
FIG. 12 depicts a diagram of an example computer system in which embodiments of the present disclosure may operate.

The processors of the compilation system 310 may execute instructions stored in a memory, and each processor may perform different instructions. One of the processors may execute instructions for a compilation strategy management unit 314 configured to access compilation operations, including compilation operations designated as compilation options or strategies. Another one of the processors may execute instruction for a compiler interface unit 315 that is communicatively coupled to the compiler 321. The compiler interface unit 315 may be configured to initiate compilation of the DUT using a compilation workflow by providing a workflow and a DUT netlist to the compiler 321. The compiler interface unit 315 may detect a failure at a first compilation operation of a compilation workflow and instruct the compiler 321 to pause compilation of the DUT. Yet another one of the processors may be configured to execute instructions for execution of a compilation strategy analysis engine 316. The compilation strategy analysis engine 316 may be configured to determine a second compilation operation based on one or more netlist parameters of the netlist of the DUT. The compilation strategy analysis engine 316 may then modify the compilation operations based on the second compilation operation. The compiler interface unit 315 may then resume compilation of the DUT by providing instructions to the compiler to resume compilation using the modified workflow having the second compilation operation. Each component of the compilation system 310 may be implemented by one or more processors or computing devices (e.g., the computing device as shown in FIG. 12). Additionally, each component may be communicatively coupled to one another. The compiler interface unit may additionally include hardware components for communicating to the compiler, including a communication connection (e.g., wired or wireless) using a corresponding protocol (e.g., universal serial bus or IEEE 802.11).

The compilation system 310 may include memory storing instructions executable by a processor and include databases such as the DUT netlist database 311, the compilation strategies database 312, and the compilation databases 313. Although the databases 311-313 are depicted as separate databases, in some embodiments, the databases 311-313 may be a single database. The DUT netlist database 311 stores netlists of DUTs to be compiled by the compiler 321. Parameters of the netlists are also stored in the database 311, which may be accessed by the compilation system 310 to determine compilation operation options when a compilation error is detected. Netlist parameters can include a number of registers, a number of clock signals, memory, target frequency of the design, a number of FPGAs to be partitioned, or any suitable parameter or value thereof for describing a circuit. The compilation strategies database 312 store compilation options and/or strategies for retrying compilation upon a detected failure. The compilation database 313 stores empirical data including previously applied compilation options or strategies, netlist parameters associated with the previously applied options or strategies, an indication of whether the previously applied compilation options or strategies succeeded, and labeled training data of previously applied options or strategies for training a machine learning model for determining a compilation option or strategy based on netlist parameters.

The network 340 may serve to communicatively couple the compilation system 310 and the host system 320. In some embodiments, the network 340 includes any combination of local area and/or wide area networks, using wired and/or wireless communication systems. The network 340 may use standard communications technologies and/or protocols. For example, the network 340 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 340 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 340 may be encrypted using any suitable technique or techniques.

Figure 4:
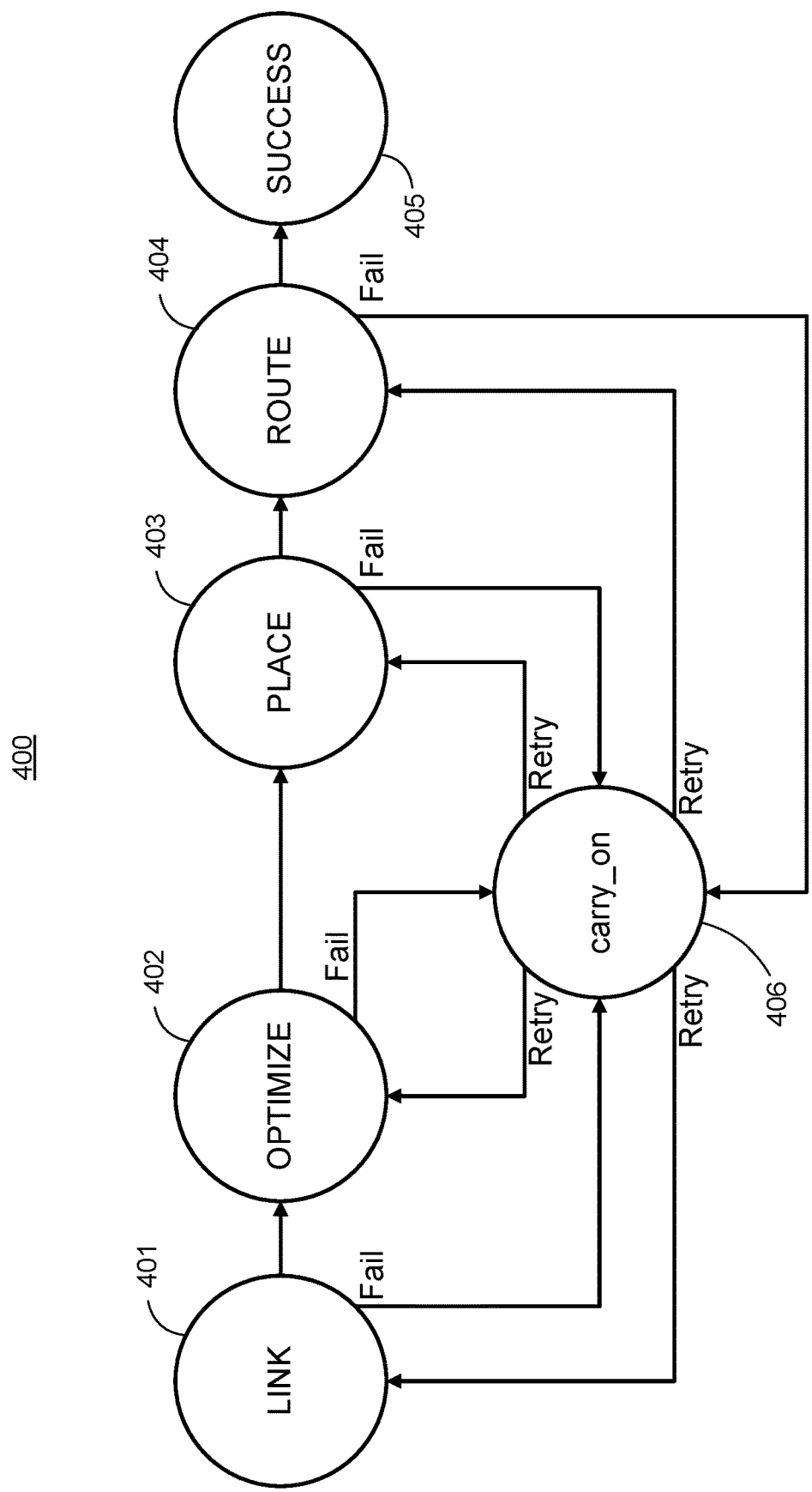
FIG. 4 depicts a finite state machine (FSM) for handling compilation retries, according to one embodiment.

FIG. 4 depicts a finite state machine (FSM) for handling compilation retries, according to one embodiment. In some embodiments, the compilation system includes a processor for executing instructions in a command language script that enables an FSM to modify a compilation workflow based on detected failures in the compilation workflow. The command language script may additionally include instructions for modifying the compilation workflow based on the netlist of the DUT being compiled (e.g., based on netlist parameter values). For example, the compilation system provides a Tool Command Language (TCL) script to a compiler or FPGA design system at a host system, where the FSM operations are instructions in the TCL script. Other scripting languages may also be provided to a compiler. Alternatively or additionally, the FSM may be implemented within the FPGA design system itself.

To avoid or mitigate against potential FPGA compilation failure, the compilation system described herein may implement an FSM 400. The FSM 400 includes a link state 401, an optimize state 402, a place state 403, a route state 404, a success state 405, and a carry_on state 406. At the states 401-404, a compiler executes a corresponding compilation operation (e.g., at the optimize state 402, the compiler executes an optimize operation). If a compiler provides a confirmation that compilation operations corresponding to each of the states 401-404 successfully executed, the FSM 400 reaches the state 405 and the compiler has succeeded in compiling the DUT and the compilation system can terminate the FSM 400. If a compiler provides a confirmation that compilation operations corresponding to any of the states 401-404 failed to execute, the FSM 400 reaches the carry_on state 406, where the compilation system determines a compilation option for the compiler to resume compilation of the DUT, where the compilation option is one of the states 401-404.

The compilation system may determine an FSM having a fixed number of states. Each state may also be an available go-back point. For example, a compiler may go back to the state 403 after the state 406 in the FSM 400. An FPGA design system may use a checkpoint to execute a go-back to a state or undo a compilation operation, such as unrouting a design. The compilation system may count a number of times that a go-back state is reached in the FSM. In some embodiments, the compilation system applies one or more threshold go-back counts and stops a compilation retry process if a threshold count is reached. For example, if the state 401 is reached over a threshold of ten times as a go-back point, the compilation system instructs the compiler to stop compilation. The compilation system may check monitor the current state of compilation at the FSM (e.g., status of compilation after each state and catch failures).

In one example of the progress of states in the FSM 400 as mapped to the compilation retry in FIG. 2, the compilation starts at the link state 401 and proceeds to the optimize state 402 after a default link operation has succeeded. After a default optimize operation has succeeded, the compiler proceeds to the place state 403 of the FSM 400. Due to a failure of a default place operation at the state 403, the next state is the "carry_on" state 406. At the state 406, a compilation option or strategy may be determined by the compilation system and loaded at the compiler. The compilation system determines the compilation operation 202, which corresponds to a go-back to the optimize state 402 of the FSM 400. At the optimize state 402, the compiler performs the compilation operation 202, as determined by the compiler system, rather than the default optimize operation. The compilation operation 202 succeeds and the compiler proceeds to the place state 403, where the default place operation succeeds (e.g., due to the modified optimize compilation operation). The compiler proceeds to the route state 404 and performs a default route operation, which succeeds and causes the compiler to proceed to the success state 405.

At the carry_on state 406, the compilation system may determine a compilation option based on a netlist of the DUT. The compilation system may apply a model to netlist parameters of the DUT and the recently failed compilation operation to determine a compilation option. The model may be a statistical model, machine learning model, or any suitable model for determining a likelihood that a compilation option will be successfully executed. In some embodiments, the compilation system applies a machine learning model that is configured to receive, as input, netlist parameters and the compilation operation that last failed and determine, as output, a likelihood that a compilation option will succeed. The machine learning model may be trained on training data including historical netlist parameters of DUTs, a last-failed operation, and an compilation option, where the training data is labeled according to whether the compilation option was successful or not.

Figure 5:
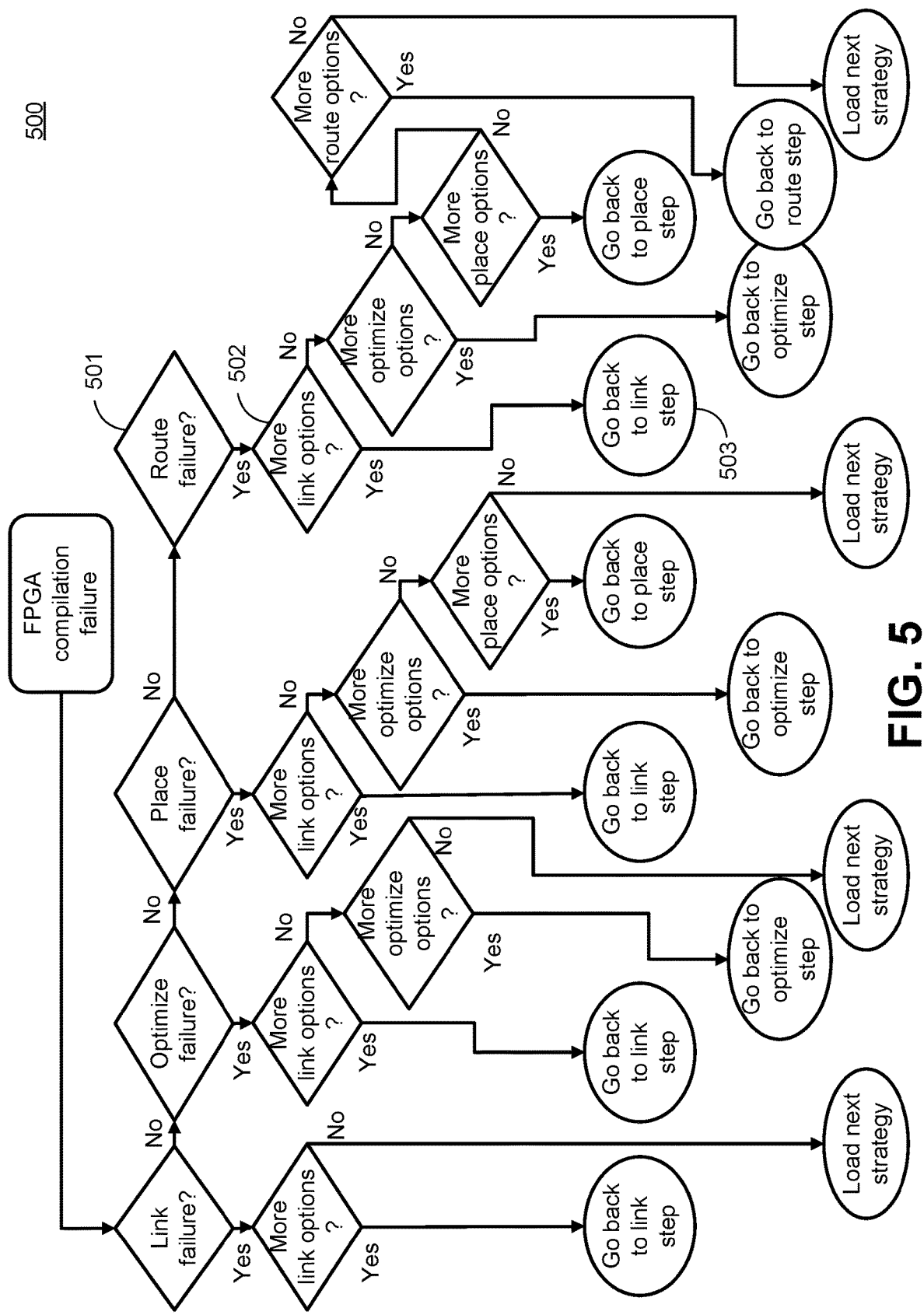
FIG. 5 is a flowchart for determining a next state in an FSM for handling compilation retries, according to one embodiment.

FIG. 5 is a flowchart for determining a next state in an FSM for handling compilation retries, according to one embodiment. A flowchart 500 shows how a go-back point of an FSM may be chosen depending on which operation fails and which operations are available for retry (e.g., the content of a given compilation strategy). The compilation system may determine which step may fail and which further or additional options may become available. For example, if the compilation fails during the place operation and the compilation system determines additional optimize options for a compiler to load, then the go-back point may be the additional optimize operation. The compilation may then be retried with the additional optimize options. Another example is a compilation failing in the optimize step. The compilation system may not have alternative link options nor optimize options, so a strategy may not have any link result to change (e.g., no alternative netlists of devices to import and link the netlist of the DUT) or optimization problem to solve (e.g., compilation system has tried available compilation optimization options for logic synthesis to minimize area usage and delays). With no additional strategies to load, the compilation system may stop the compilation workflow and provide a notification to a user that no untried compilation options or strategies are available.

The compilation system may apply a machine learning model to determine a compilation option or go-back point upon compilation failure. In some embodiments, the compilation system may apply the machine learning model to determine go-back states in the flowchart 500. For example, when after determining that there is a route failure at decision state 501, the compiler system may, if there are additional link options, apply a machine learning model at the decision state 502 to determine which link options to apply at the go-back link state 503.

Figure 6:
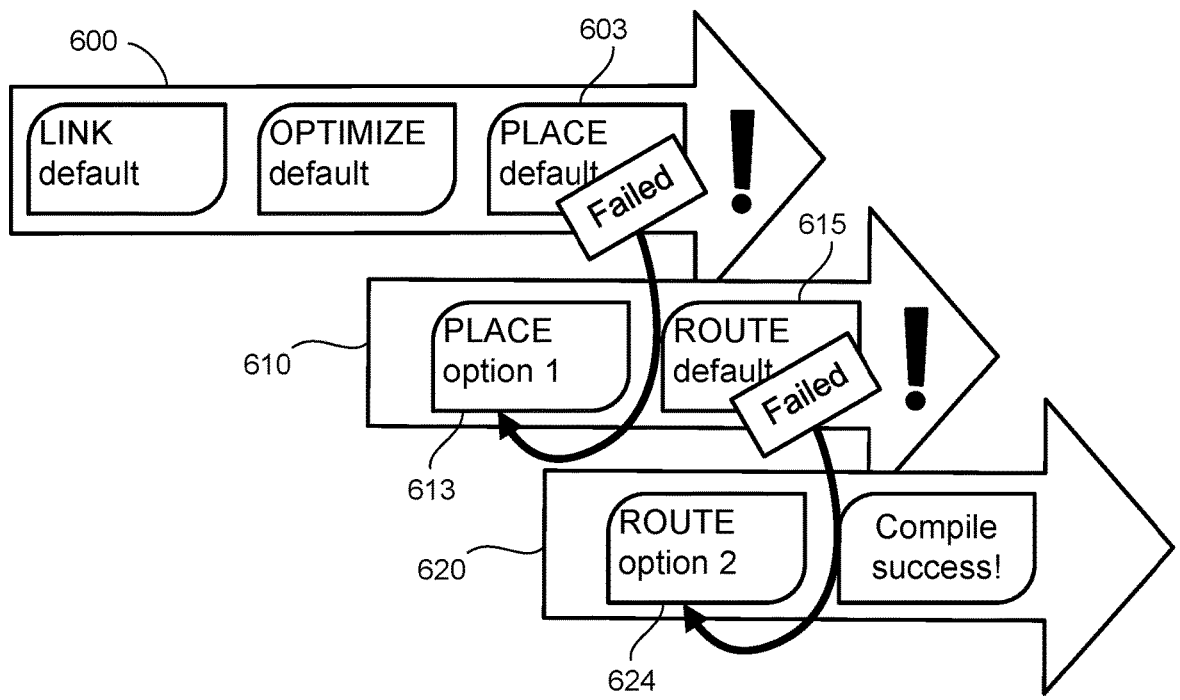
FIG. 6 illustrates a successful compilation that has been retried using an FSM, according to one embodiment.

FIG. 6 illustrates a successful compilation that has been retried using an FSM, according to one embodiment. The compilation system handles multiple compilation failures until a successful compilation. In particular, compilation workflows 600, 610, and 620 are executed by the compilation system until the compilation succeeds. The compilation system may determine a compilation option (e.g., a place operation 613) to modify the failed compilation workflow 600 into the compilation workflow 610. The compilation system may further determine a compilation option (e.g., a route operation 624) to modify the failed compilation workflow 610 into the compilation workflow 620.

A first compilation failure may occur at the place operation 603 of the compilation workflow 600. Compilation may fail when a P&R system has too many cells to allocate than are available in the FPGA. In one example, the compilation system determines a place option (e.g., the operation 613) that may include remapping these cells onto other cells with compatible functionality. For instance, multiple LUTRAMs may be combined into Block RAMs. The place option may be determined using a machine learning model trained on historical netlist parameters indicating a similar number of cells and previously successful compilation options. The model may determine that the operation 613 has a likelihood of success exceeding a threshold likelihood, and the compilation system may determine to load the operation 613. In some embodiments, the compilation system maintains lists of compilation options, each list's compilation options sorted based on a likelihood of success. For example, the compilation system may maintain lists of compilation options for proceeding upon a failure of the place operation 603, where the place operation 613 is ranked as having the highest likelihood of success. The lists may be further distinguished based on netlist parameters (e.g., one list may be split into additional lists sorted based on the likelihood of success for DUTs having similar netlists parameters).

After loading the place operation 613 and resuming compilation with the compilation workflow 610, the operation 613 may be successful but the route operation 614 may fail. In one example, a cause of a route failure is not complying with timing constraints. The compiler may determine a route option (e.g., the operation 624) that routes critical timing paths through a smaller number of cells. This route option may be determined using a machine learning model trained based on historical netlist parameters and successful compilation options. The compilation system may load the route operation 624, and specifically "Option 2" of available route options. Thus, the compilation system provides an additional go-back to the route operation 624, as opposed to returning to an earlier step (e.g., place or optimize) or to the beginning of the compilation at a link operation.

The compilation retry shown in FIG. 6 may be mapped to states in an FSM (e.g., the FSM 500). The compilation system initiates compilation using the compilation workflow 600, starting with a link operation at the link state 501. Successful operations at the link and optimize states cause the current state to progress to the place state 503, where the operation 603 fails and the current state of the FSM 500 progresses to the carry_on state 506. The compilation system determines to resume compilation at the place operation 613, which causes a go-back to the place state 503 on the FSM 500. While the place operation 613 succeeds and the current state progresses to the route state 504, the failure of the route operation 614 causes the current state to return to carry_on state 506. The compilation system then determines to resume compilation at the route operation 624, which causes a go-back to the route state 504 on the FSM 500. Because the route operation 624 is successful, the current state of the FSM 500 progresses to the success state 505.

Figure 7:
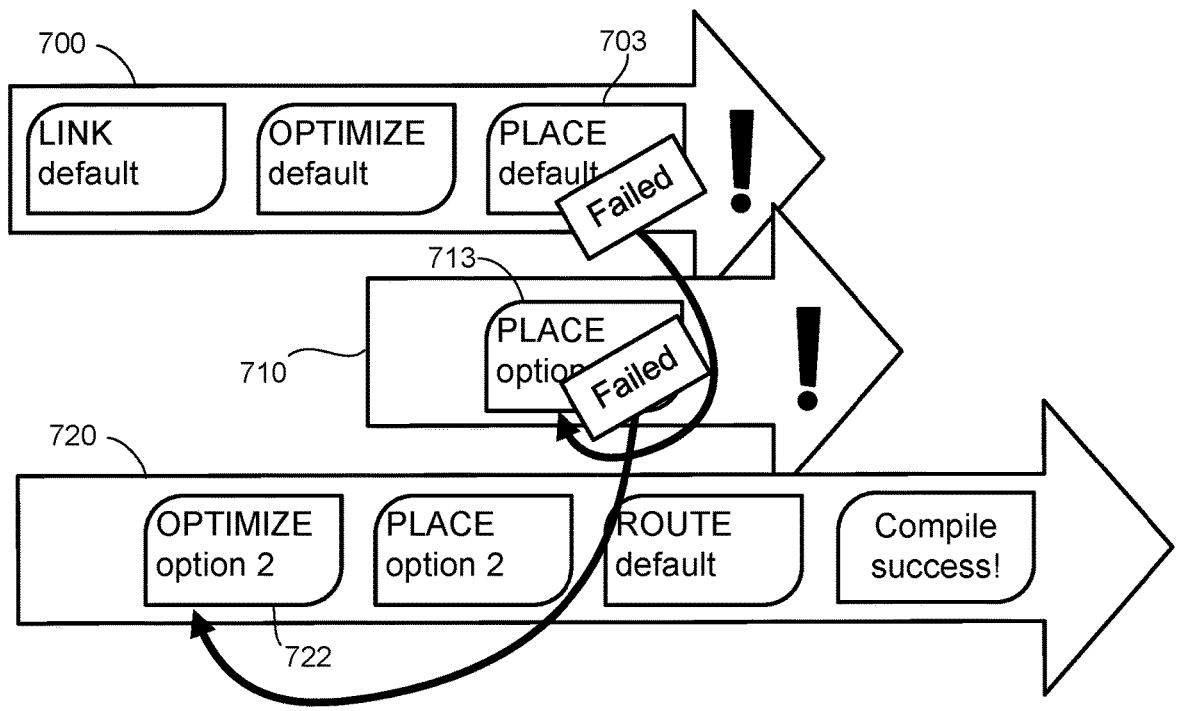
FIG. 7 illustrates a successful compilation that has been retried using compilation strategies, according to one embodiment.

FIG. 7 illustrates a successful compilation that has been retried using compilation strategies, according to one embodiment. The compilation system handles multiple compilation failures until a successful compilation. In particular, compilation workflows 700, 710, and 720 are executed by compiler until the compilation succeeds. The compilation system may determine a compilation option (e.g., a place operation 713) to modify the failed compilation workflow 700 into the compilation workflow 710. The compilation system may further determine a compilation option (e.g., a optimize operation 722) to modify the failed compilation workflow 710 into the compilation workflow 720.

A compilation strategy may include one or more compilation options for resuming compilation upon detecting a compilation failure. A compilation strategy may correspond to a particular failed compilation workflow operation. For example, the compilation system may maintain a list of compilation strategies, each strategy mapped to a compilation operation. In this way, the compilation system may access a compilation strategy based on which compilation operation has failed. A compilation strategy may define what will be done, selecting which compilation options may be loaded and possible go-back paths for an FSM. The strategies may be defined by a user (e.g., a research and development (R&D) engineers, an FPGA user, and an emulator user specifying custom strategies), and/or at least one machine learning process.

Each strategy may modify a compilation operation with a different compilation option. Table 2 shows examples of compilation strategies from which the compilation system may select to load at the compiler and resume compilation. In some embodiments, the strategies shown in Table 2 may be used upon determining a compilation error has occurred at a place operation. Strategy 1 may define a go-back point as "place" and compilation option as "Option place1." The compilation system may resume the modified compilation workflow using Strategy 1.

TABLE 2

Compilation strategy examples

| Strategies | Link | Optimize | Place | Route |
|---|---|---|---|---|
| Strategy 1 | | | Option place1 | |
| Strategy 2 | | Option opt1 | Option place2 | |

Strategy 2 may define options "Option opt1" and "Option place2." The compilation system may resume compilation with "optimize" being the first step that is modified in the compilation workflow. Strategy 2 may be used upon a failure in Strategy 1. For example, the compilation options "Option opt1" and "Option place2" may be used to resume compilation upon a compilation failure at the "place" operation in Strategy 1.

In FIG. 7, after a first failure at the place operation 703, Strategy 1 defines go-back point as a place operation using a first place option, "Option 1." A compiler, in one example place operation can disable global buffer insertion during placement. After a second failure of the place operation 713, the compilation system determines to apply Strategy 2, which defines the go-back option as an optimize operation 722, "Option 2." For example, the compilation system may determine an optimize operation of specifying a maximum fanout assigned to a driver cell during optimize. A compiler can then replicate net drivers with fanout greater than the specified limit according to the logical hierarchy.

TABLE 3

Additional strategy examples corresponding to FIG. 7

| Strategies | Link | Optimize | Place | Route |
|---|---|---|---|---|
| Strategy 1 | | | Option 1 | |
| Strategy 2 | | Option 2 | Option 2 | |
| Next incremental strategy | | Option 2 | Option 2 | |

The compilation strategies are shown in Table 3. The compilation system may maintain a data structure for lists of strategies. For example, the compilation system may list strategies into plain text files or structured text files, such as Extensible Markup Language (XML) files, or binary formats, including implementations such as a structured or unstructured database.

Figure 8:
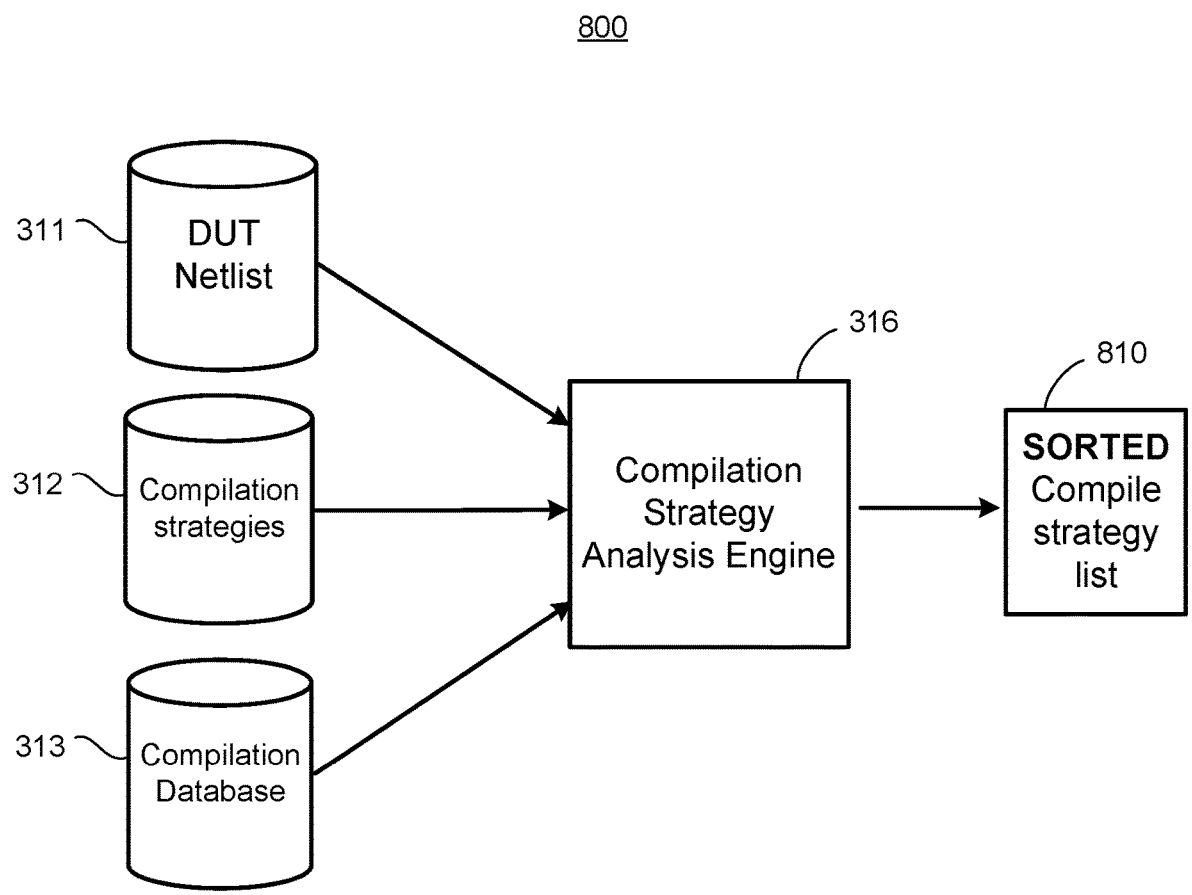
FIG. 8 depicts a block diagram process for determining compilation strategies using machine learning, according to one embodiment.

FIG. 8 depicts a block diagram process for determining compilation strategies using machine learning, according to one embodiment. A block diagram process 800 includes a DUT netlist database 311, compilation strategies database 312, a compilation database 313, and a compilation strategy analysis engine 316 of FIG. 3. The compilation strategy analysis engine 316 produces a sorted list of compilation strategies 810. The DUT netlist database 311 may include netlist parameters of the DUT currently being compiled for emulation. A design netlist and the netlist parameters of the design netlist may be provided to the compilation strategy analysis engine 316. The compilation strategy analysis engine 316 may be a processor of the compilation system executing instructions stored at the compilation system for determining a compilation option or strategy after a compilation error is detected. The compilation strategy analysis engine 316 may include a machine learning model and the compilation database 313 may include labeled training data for training the machine learning model. Further, while the databases 311-313 are depicted in FIG. 8 as separate databases, in some embodiments, the databases 311-313 may be a single database.

The machine learning model may use various machine learning techniques such as linear support vector machine (linear SVM), boosting for other algorithms (e.g., AdaBoost), neural networks, logistic regression, naïve Bayes, memory-based learning, bagged trees, decision trees, boosted trees, boosted stumps, a supervised or unsupervised learning algorithm, or any suitable combination thereof. The training data may include previously loaded compilation strategies and DUT netlist parameters (e.g., a number of registers or clock signals), and the labels may indicate whether the previously loaded compilation strategy was successful or not. As the compilation system handles compilation failures using compilation strategies and options, the compilation system may include additional compilation strategies into the compilation database 313 labeled with the resulting success or failure in compilation. Each labeled result of using a compilation option or strategy may be an annotated record in the compilation database 313 that can be queried for future compilations of DUTs. Additionally or alternatively, the compilation system may use the results of compilation retries to modify weights used for different data sets within the training data, increasing the likelihood of loading a strategy that has been successful multiple times and decreasing the likelihood of loading a strategy that has failed multiple times.

The compilation system may sort the compilation strategies in the database 312 by success probability criteria. For example, the list of strategies may be sorted by respective likelihoods of success by using the likelihoods as output by a machine learning model that receives netlist parameters and compilation options or strategies as input. Alternatively, an order of strategies may be manually specified by a user. The compilation system may apply compilation strategies in the sequence that the strategies are sorted in the list 810. Upon a compilation failure, the compilation system may resume compilation by loading the compilation strategy with the next highest success probability.

By predicting a set of candidates as winning strategies, the machine learning process may reduce the effort spent in FPGA compilation, according to some embodiments. As a further beneficial effect of using at least one machine learning model or machine learning process to predict a set of candidates as winning strategies, hardware-performance overhead and computation time may be reduced as a result of avoiding launch of more strategies than otherwise may have been needed.

In an embodiment where the compilation system updates the sorted list of strategies 810, feedback of whether a compilation option or strategy was successful may alter the order of the sorted list. For example, an unsuccessful compilation may demote a ranking of the unsuccessful strategy while a successful compilation may promote the ranking of the successful strategy. Due to the feedback processes described above, the compilation system may utilize compilation results as feedback to improve the determination of the compilation option or strategy that has the highest likelihood of successfully compiling the DUT. An example of this feedback process is depicted in FIG. 9.

Figure 9:
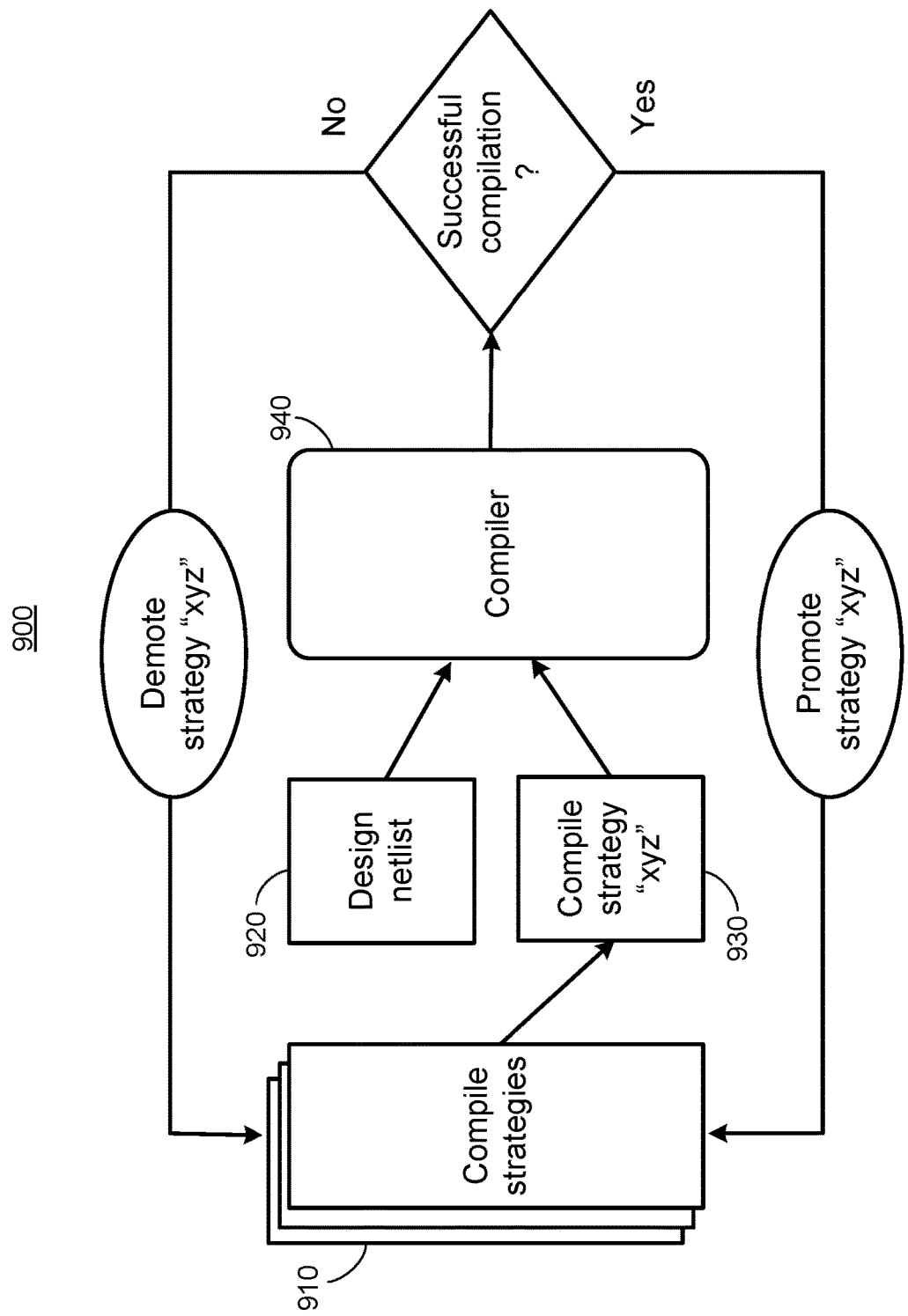
FIG. 9 depicts a block diagram process for ranking a list of compilation strategies based on a result of an FPGA compilation, according to one embodiment.

FIG. 9 depicts a block diagram process for ranking a list of compilation strategies based on a result of an FPGA compilation, according to one embodiment. A block diagram process 900 includes a list of compilation strategies 910, a design netlist 920, a selected compilation strategy 930, and a compiler 940. The list of compilation strategies 910 may be sorted based on a likelihood of success. For example, as described in FIG. 8, a model, such as a machine learning model, determines the sorted list by determining likelihoods of success from correlating netlist parameters to compilation strategies that have been successful for similar netlist parameters or ranges of values of the parameters. For example, the list of compilation strategies 910 may be the sorted list 810 output by the compilation strategy analysis engine 840 of FIG. 8. The compilation system may select the strategy 930 from the list 910 based on the design netlist 920. The compilation system may then provide the design netlist 920 and the selected compilation strategy 930 to the compiler 940 for compilation. Whether the compilation succeeded or failed using the compilation option or strategy determined by the model may be used to promote or demote the ranking of the selected strategy 930 in the list of compilation strategies 910.

This process may realize notable advantages in terms of performance gain (or resource reduction) on a relatively large DUT on a scale of hundreds of FPGAs mapped, where only a few of the FPGAs may have been modified compared to a previous compilation. For instance, with reference to FIG. 7 and Table 3, Strategy 2 may lead to a successful compilation. As a result, Strategy 2 may then be set as a default compilation options for the next DUT compilation, according to some embodiments, as shown in FIG. 9 (e.g., "xyz").

In some embodiments, the compilation system may use a combination of compilation strategies to determine a compilation strategy with which to resume compilation. As discussed above, the compilation system may be able to handle multiple consecutive failures. In this context, several compilation strategies may be applied to solve issues at any or each compilation step. Another solution may include combining compilation options of different operation types, as shown in Table 4.

TABLE 4

| Combining strategies | | | | |
|---|---|---|---|---|
| Strategies | Link | Optimize | Place | Route |
| Strategy 1 | | Option 1 | | |
| Strategy 2 | | Option 2 | | |
| Strategy 3 | | Option 3 | | |
| Strategy 4 | | | Option 1 | |
| Strategy 5 | | | Option 2 | |
| Strategy 6 | | | | Option 1 |
| Strategy 7 | | | | Option 2 |
| Strategy 8 | | | | Option 3 |
| Strategy 9 | | | | Option 4 |
| Next incremental strategy | | Option 3 | Option 2 | Option 4 |

Table 4 shows an example of available strategies formatted as a list (e.g., the sorted list 810 of FIG. 8). If a link operation processes with no problems, no strategy may be loaded. If an optimize operation fails with Strategies 1 and 2, the compilation system may load Strategy 3 having compilation option "Option 3" to result in a successful optimize operation. Additionally, a place operation may fail and continue to fail multiple times until loading "Option 2" of Strategy 5. Similarly, a route step may fail until loading "Option 4" of Strategy 9. Any of these strategies alone may result in overall failure of a compiler flow. For this particular embodiment, a combination of three specific strategies (e.g., "optimize" with "Option 3" and "place" with "Option 2" and "route" with "Option 4") may be needed for a successful compilation.

As explained above, this complex solution may be recorded once it is determined to have been successful, such as following a given manual script or configuration, an ML-based configuration, or a combination thereof. The recorded solution (strategies) may be promoted as a new default compilation strategy for a subsequent DUT compilation, such as based on a compilation project or based on components to be compiled.

Figure 10:
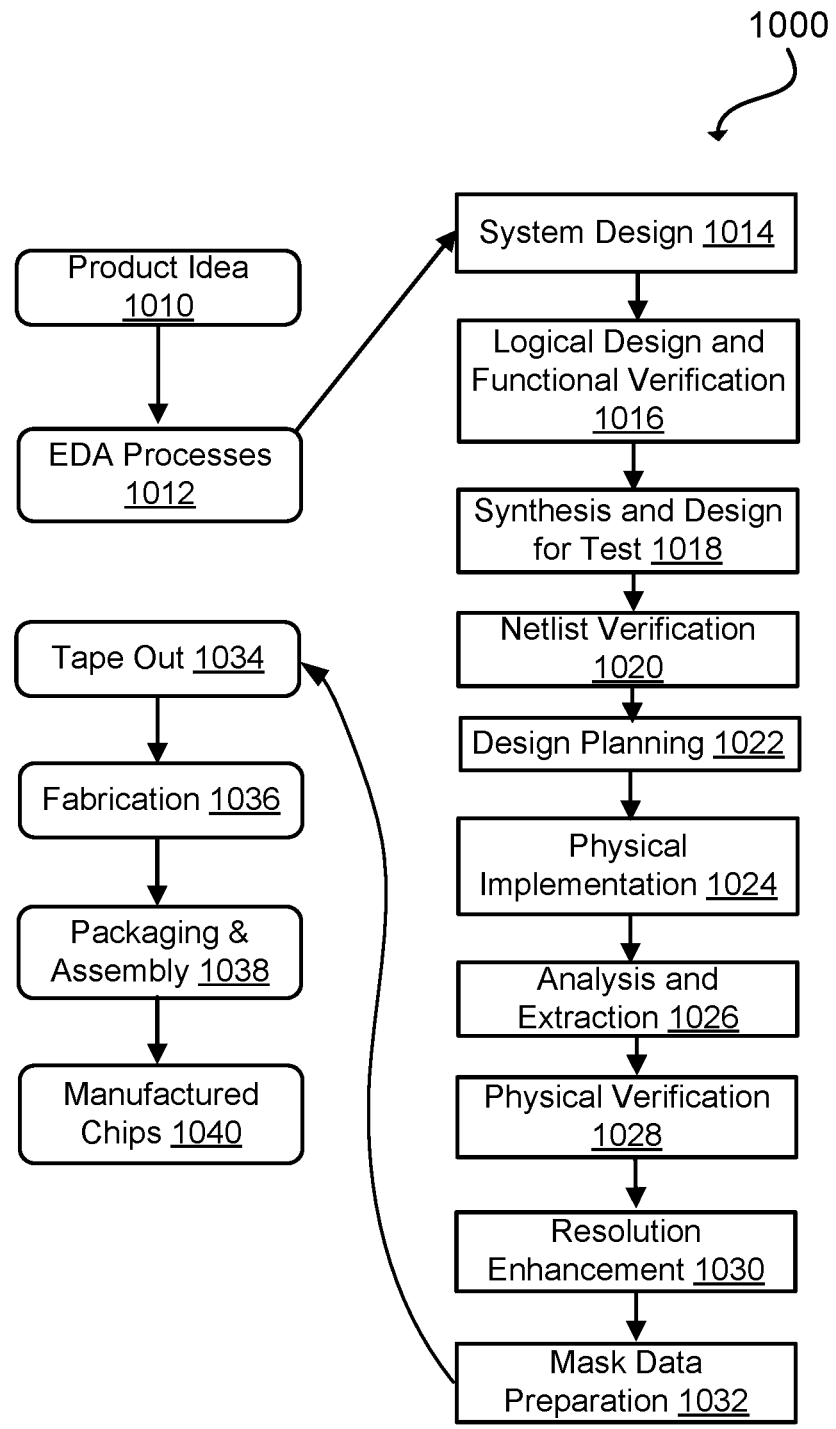
FIG. 10 depicts a flowchart of various processes used during the design and manufacture of an integrated circuit in accordance with some embodiments of the present disclosure.

FIG. 10 illustrates an example set of processes 1000 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1010 with information supplied by a designer, information which is transformed to create an article of manufacture that uses a set of EDA processes 1012. When the design is finalized, the design is taped-out 1034, which is when artwork (e.g., geometric patterns) for the integrated circuit is sent to a fabrication facility to manufacture the mask set, which is then used to manufacture the integrated circuit. After tape-out, a semiconductor die is fabricated 1036 and packaging and assembly processes 1038 are performed to produce the finished integrated circuit 1040.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 10. The processes described by be enabled by EDA products (or tools).

During system design 1014, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1016, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1018, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1020, the netlist is checked for compliance with timing constraints and for correspondence with the HDL code. During design planning 1022, an overall floor plan for the integrated circuit is constructed and analyzed for timing and top-level routing.

During layout or physical implementation 1024, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1026, the circuit function is verified at the layout level, which permits refinement of the layout design. During physical verification 1028, the layout design is checked to ensure that manufacturing constraints are correct, such as DRC constraints, electrical constraints, lithographic constraints, and that circuitry function matches the HDL design specification. During resolution enhancement 1030, the geometry of the layout is transformed to improve how the circuit design is manufactured.

During tape-out, data is created to be used (after lithographic enhancements are applied if appropriate) for production of lithography masks. During mask data preparation 1032, the 'tape-out' data is used to produce lithography masks that are used to produce finished integrated circuits.

A storage subsystem of a computer system (such as computer system 1200 of FIG. 12, or host system 1107 of FIG. 11) may be used to store the programs and data structures that are used by some or all of the EDA products described herein, and products used for development of cells for the library and for physical and logical design that use the library.

FIG. 11 depicts a diagram of an example emulation environment 1100. An emulation environment 1100 may be configured to verify the functionality of the circuit design. The emulation environment 1100 may include a host system 1107 (e.g., a computer that is part of an EDA system) and an emulation system 1102 (e.g., a set of programmable devices such as Field Programmable Gate Arrays (FPGAs) or processors). The host system generates data and information by using a compiler 1110 to structure the emulation system to emulate a circuit design. A circuit design to be emulated is also referred to as a Design Under Test ('DUT') where data and information from the emulation are used to verify the functionality of the DUT.

The host system 1107 may include one or more processors. In the embodiment where the host system includes multiple processors, the functions described herein as being performed by the host system can be distributed among the multiple processors. The host system 1107 may include a compiler 1110 to transform specifications written in a description language that represents a DUT and to produce data (e.g., binary data) and information that is used to structure the emulation system 1102 to emulate the DUT. The compiler 1110 can transform, change, restructure, add new functions to, and/or control the timing of the DUT.

The host system 1107 and emulation system 1102 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1107 and emulation system 1102 can exchange data and information through a third device such as a network server.

The emulation system 1102 includes multiple FPGAs (or other modules) such as FPGAs 1104$_1$ and 1104$_2$ as well as additional FPGAs to 1104$_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1102 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 1104$_1$-1004$_N$ may be placed onto one or more boards 1112$_1$ and 1112$_2$ as well as additional boards through 1112$_M$. Multiple boards can be placed into an emulation unit 1114$_1$. The boards within an emulation unit can be connected using the backplane of the emulation unit or any other types of connections. In addition, multiple emulation units (e.g., 1114$_1$ and 1114$_2$ through 1114$_K$) can be connected to each other by cables or any other means to form a multi-emulation unit system.

For a DUT that is to be emulated, the host system 1107 transmits one or more bit files to the emulation system 1102. The bit files may specify a description of the DUT and may further specify partitions of the DUT created by the host system 1107 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1107 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal.

Afterwards, the circuit designer can request to re-emulate the same component for a different time period or to re-emulate another component.

A host system 1107 and/or the compiler 1110 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1105 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA.

The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Example benefits and advantages of the disclosed configurations include reducing consumption of processing resources by a compiler at a host system. Conventional compilation workflows may be designed to restart compilation of a DUT from the beginning of the workflow in case of compile failure. However, these restarts are costly, time-consuming, and otherwise inefficient. The compilation system described herein determines a compilation operation from which the compilation workflow can be resumed (e.g., in an intermediate step of the compilation workflow) rather than restarted from the beginning. For example, after the failed compilation shown in FIG. 2, the compilation system may determine to return to the optimize operation as shown rather than the earlier link operation at the beginning of the compilation workflow. This may be advantageous for saving compilation time and processing resources.

Furthermore, the present techniques of compilation may proceed without terminating a current process. Strategies may be tested sequentially, and therefore, the computation capacity allocated for compilation may be reduced compared to parallel execution, for example. Thus, resources may not be overloaded by a set of parallel tasks for compilation. Additionally, compilation strategies may be listed on multiple file formats. The compilation strategies may be provided by the FPGA design system itself, scripted by R&D engineers, dynamically created by additional tools (such as with machine-learning processes), or a combination thereof, among other possibilities.

Strategies may be designed to achieve specific design objectives. For example, a 6-input look-up-table (LUT6) may be remapped to multiple 3-input look-up-table (LUT3) instances, and those may be dispatched on a logic array, such as an FPGA or other implementation, according to an embodiment. Compilation strategies thus may provide guidance to FPGA design systems from various vendors. Strategies may affect other aspects of system operation, such as whether to bias more or fewer nets, longer or shorter wires, more or fewer passes of a given optimization or other algorithm at compile time, among other configuration options or compiler flags. Other ways in which strategies may be beneficial include leveraging ML models and related processes, as described herein.

Another implementation may be to define all the compilation strategies in a list, which may be a sorted list, in an embodiment. In an example sorted list, the sorted list may be sorted by the chance of succeeding. Accordingly, the compilation system decreases processing resources required to determine the compilation option with which to resume compilation for subsequent compilations (e.g., compiling a DUT using a previously successful compilation strategy for a DUT with a similar netlist). Compilation strategies may be applied step by step. With several consecutive failing steps, the automatic sequential retry on failure FPGA compiler may be able to mix solutions and create combined workflows that may still be relatively efficient with computing resources.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium comprising stored instructions, wherein the stored instructions, when executed by a processor, cause the processor to:
   access a plurality of compilation operations, wherein a compiler executes a compilation of a design under test (DUT) using a sequence of compilation operations of the plurality of compilation operations, the DUT characterized by a netlist;
   pause, responsive to detecting a failure at a first compilation operation of the sequence of compilation operations during the compilation of the DUT, the compilation of the DUT;
   determine a second compilation operation of the plurality of compilation operations based on one or more netlist parameters of the netlist, wherein the second compilation operation is different from the first compilation operation; and
   resume the compilation of the DUT at the second compilation operation.

2. The non-transitory computer readable medium of claim 1, wherein the first compilation operation includes a design placement in the sequence of compilation operations.

3. The non-transitory computer readable medium of claim 2, wherein the failure comprises determining that a number of cells of the DUT exceeds an available number of cells for allocation by an emulation system coupled to the compiler.

4. The non-transitory computer readable medium of claim 1, wherein the first compilation operation includes a design routing in the sequence of compilation operations.

5. The non-transitory computer readable medium of claim 4, wherein the failure comprises determining that the design routing fails to comply with a plurality of timing constraints.

6. The non-transitory computer readable medium of claim 1, wherein the instructions to determine the second compilation operation comprise instructions that cause the processor to:
apply a machine learning model to the one or more netlist parameters, the machine learning model configured to determine the second compilation operation based on historical netlist parameters and historical sequences of compilation operations.

7. The non-transitory computer readable medium of claim 1, wherein the instructions further comprise instructions that cause the processor to:
receive a command language script comprising a plurality of instructions for modifying the sequence of compilation operations based on detected failures in the sequence of compilation operations and the one or more netlist parameters; and
initiate the sequence of compilation operations at the compiler using the command language script.

8. The non-transitory computer readable medium of claim 1, wherein the sequence of compilation operations is executed by the compiler using a finite state machine comprising a plurality of states corresponding to the sequence of compilation operations.

9. The non-transitory computer readable medium of claim 1, wherein the instructions to determine the second compilation operation comprise instructions that cause the processor to:
determine that the second compilation operation is mapped to a plurality of historical netlist parameter values within a threshold range of a value of the one or more netlist parameters.

10. The non-transitory computer readable medium of claim 1, wherein the instructions further comprise instructions that cause the processor to:
detect that the compilation of the DUT using the second compilation operation is successful;
generate a record mapping the second compilation operation and the one or more netlist parameters; and
annotate the record as successfully compiling the DUT, wherein the record can be queried for a subsequent compiling of another DUT using a netlist parameter of the other DUT.

11. The non-transitory computer readable medium of claim 1, wherein an operation type of the second compilation operation is the same as the operation type of the first compilation operation.

12. A method comprising:
accessing a plurality of compilation operations, wherein a compiler executes a compilation of a DUT using a sequence of compilation operations of the plurality of compilation operations, the DUT characterized by a netlist;
pausing, responsive to detecting a failure at a first compilation operation of the sequence of compilation operations during the compilation of the DUT, the compilation of the DUT;
determining a second compilation operation of the plurality of compilation operations based on one or more netlist parameters of the netlist, wherein the second compilation operation is different from the first compilation operation; and
resuming the compilation of the DUT at the second compilation operation.

13. The method of claim 12, further comprising:
applying a machine learning model to the one or more netlist parameters, the machine learning model configured to determine the second compilation operation based on historical netlist parameters and historical sequences of compilation operations.

14. The method of claim 12, further comprising:
receiving a command language script comprising a plurality of instructions for modifying the sequence of compilation operations based on detected failures in the sequence of compilation operations and the one or more netlist parameters; and
initiating the sequence of compilation operations at the compiler using the command language script.

15. The method of claim 12, wherein the sequence of compilation operations is executed by the compiler using a finite state machine comprising a plurality of states corresponding to the sequence of compilation operations.

16. The method of claim 12, wherein determining the second compilation operation comprises determining that the second compilation operation is mapped to a plurality of historical netlist parameter values within a threshold range of a value of the one or more netlist parameters.

17. A system comprising:
a compilation strategy management unit configured to:
access a plurality of compilation operations, wherein a compiler executes a compilation of a design under test (DUT) using a sequence of compilation operations of the plurality of compilation operations, the DUT characterized by a netlist;
a compiler interface unit coupled to the compiler, the compiler interface unit configured to:
pause, responsive to detecting a failure at a first compilation operation of the sequence of compilation operations during the compilation of the DUT, the compilation of the DUT; and
resume the compilation of the DUT at a second compilation operation; and
a compilation strategy analysis engine coupled to the compilation strategy management unit and the compiler interface unit, the compilation strategy analysis engine configured to:
determine the second compilation operation of the plurality of compilation operations based on one or more netlist parameters of the netlist, wherein the second compilation operation is different from the first compilation operation.

18. The system of claim 17, wherein the compilation strategy analysis engine is further configured to:
apply a machine learning model to the one or more netlist parameters, the machine learning model configured to determine the second compilation operation based on historical netlist parameters and historical sequences of compilation operations.

19. The system of claim 17, wherein the compiler interface unit is further configured to:
receive a command language script comprising a plurality of instructions for modifying the sequence of compilation operations based on detected failures in the sequence of compilation operations and the one or more netlist parameters; and
initiate the sequence of compilation operations at the compiler using the command language script.

20. The system of claim 17, wherein the compilation strategy analysis engine is configured to determine the second compilation operation by:

determining that the second compilation operation is mapped to a plurality of historical netlist parameter values within a threshold range of a value of the one or more netlist parameters.

* * * * *